(12) United States Patent
Estes et al.

(10) Patent No.: US 7,541,549 B2
(45) Date of Patent: Jun. 2, 2009

(54) VACUUM TRANSFER APPARATUS HAVING LOAD ISOLATION WEIGHING SYSTEM INCLUDING A RIGID PIPE SECTION PIVOTALLY MOUNTED TO A SUPPORT FRAME

(75) Inventors: Andrew C. Estes, Russellville, AR (US); Kyle A. Stobaugh, Russellville, AR (US); Mark A. Moody, Bellville, AR (US); Jeremy B. Estes, Russellville, AR (US); Ray W. Balaster, Russellville, AR (US); Kurt R. Danzy, Russellville, AR (US)

(73) Assignee: Cooling & Applied Technology, Inc., Russellville, AR (US)

( * ) Notice: Subject to any disclaimer, the term of this patent is extended or adjusted under 35 U.S.C. 154(b) by 153 days.

(21) Appl. No.: 11/651,761

(22) Filed: Jan. 10, 2007

(65) Prior Publication Data
US 2008/0164075 A1 Jul. 10, 2008

(51) Int. Cl.
G01G 13/02 (2006.01)
(52) U.S. Cl. ............ 177/116; 406/23; 406/25; 406/151; 222/77
(58) Field of Classification Search ........... 406/23–25, 406/151–153; 222/55, 56, 77; 177/116–122
See application file for complete search history.

(56) References Cited

U.S. PATENT DOCUMENTS

| 795,412 | A | 7/1905 | Olson |
| 1,937,158 | A | 11/1933 | Lorentz |
| 1,965,866 | A | 7/1934 | Tolman, Jr. |
| 3,186,768 | A | 6/1965 | Pendleton |
| 3,226,164 | A | 12/1965 | Merrick |
| 3,386,773 | A | 6/1968 | Ballard, Jr. |
| 3,423,130 | A | 1/1969 | Milner |
| 3,431,026 | A | 3/1969 | Russell |
| 3,620,575 | A | 11/1971 | McIver et al. |
| 3,694,037 | A | 9/1972 | Feder |

(Continued)

Primary Examiner—Randy W Gibson
(74) Attorney, Agent, or Firm—Ray F. Cox, Jr.

(57) ABSTRACT

A vacuum transfer system having a weighing hopper mounted via at least one load cell to a frame. The weighing hopper is provided with an inlet connected via a product line to a product inlet hopper and a sliding outlet gate. An actuator valve is operatively connected to the weighing hopper and to a vacuum source. A controller is operatively connected to the actuator valve and also controls the opening and closing of the sliding gate. The product line comprises a flexible pipe section and a rigid pipe section pivotally mounted to the frame at a pivot disposed substantially vertically below the center of the flexible pipe section. In operation, the operator keys into the controller a target rate of product transfer and a target weight of product in the weighing hopper. The actuator valve applies vacuum to the weighing hopper in order to transfer the product from the inlet hopper to the weighing hopper. When the preset target weight of product in the weighing hopper is reached, the actuator valve bleeds off the vacuum in the weighing hopper before the load cells weigh the product contained in the weighing hopper. Release of the product is delayed until the release of the product results in an actual rate of product transfer equal to the target rate of product transfer. The product is released by opening the sliding gate. The load cells are zeroed after each cycle in order to minimize any drift in the weight measurements.

10 Claims, 8 Drawing Sheets

U.S. PATENT DOCUMENTS

| | | | |
|---|---|---|---|
| 3,776,600 A | 12/1973 | McLeod, Jr. | |
| 3,861,830 A | 1/1975 | Johnson | |
| 3,944,118 A | 3/1976 | Trill | |
| 4,081,110 A | 3/1978 | Evans | |
| 4,172,535 A | 10/1979 | Smith | |
| 4,238,058 A | 12/1980 | Heth | |
| 4,341,492 A | 7/1982 | Montgomery, Jr. et al. | |
| 4,345,858 A | 8/1982 | Barlow | |
| 4,348,872 A | 9/1982 | Hill | |
| 4,423,987 A | 1/1984 | Powers | |
| 4,481,985 A * | 11/1984 | Bruder et al. | 141/1 |
| 4,583,605 A * | 4/1986 | Hirano | 177/50 |
| 4,668,131 A | 5/1987 | Hart, Sr. et al. | |
| 4,812,086 A | 3/1989 | Kopernicky | |
| 5,006,018 A | 4/1991 | Depew | |
| 5,037,246 A | 8/1991 | Okano et al. | |
| 5,064,314 A | 11/1991 | Grooms et al. | |
| 5,221,299 A | 6/1993 | Boring | |
| 5,354,152 A | 10/1994 | Reinhardt et al. | |
| 5,487,228 A | 1/1996 | Marazzo et al. | |
| 5,669,741 A | 9/1997 | Ono et al. | |
| 5,791,830 A | 8/1998 | Fort et al. | |
| 6,050,750 A | 4/2000 | Aoki | |
| 6,089,794 A | 7/2000 | Maguire | |
| 6,413,020 B1 | 7/2002 | Davison | |
| 6,430,802 B1 | 8/2002 | Miyajima | |
| 6,503,026 B1 | 1/2003 | Mitchell | |
| 6,561,894 B1 | 5/2003 | Miyajima | |
| 6,619,467 B1 | 9/2003 | Nakagawa et al. | |
| 6,620,243 B1 | 9/2003 | Bertellotti et al. | |
| 7,368,671 B2 * | 5/2008 | Volkmann | 177/116 |
| 2002/0136609 A1 | 9/2002 | Maguire | |

* cited by examiner

VACUUM TRANSFER APPARATUS HAVING LOAD ISOLATION WEIGHING SYSTEM INCLUDING A RIGID PIPE SECTION PIVOTALLY MOUNTED TO A SUPPORT FRAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a system and method for vacuum transfer of a product, and in particular, to such a system that transfers the product at a rate based on a measured weight of the product.

BRIEF SUMMARY OF THE INVENTION

The present invention comprises a weighing hopper mounted via at least one load cell to a frame. The weighing hopper is provided with an inlet connected via a product line to a product inlet hopper. The weighing hopper is also provided with an outlet gate. An actuator valve is operatively connected to the weighing hopper and to a vacuum source. A controller operatively connected to the actuator valve to determine when the actuator valve applies a vacuum to the weighing hopper. The controller also controls the opening and closing of the outlet gate, which is preferably a sliding gate.

The product line comprises a rigid pipe section and a flexible pipe section. The rigid pipe section is pivotally mounted to the frame at a pivot disposed substantially vertically below the center of the flexible pipe section. The flexible pipe section provides a degree of isolation of the weighing hopper from forces caused by the rigid pipe section that might adversely affect the weight measured by the load cells. The location of the pivot also minimizes the affect of the rigid pipe section bearing against the flexible pipe section and thereby exerting a downward force against the weighing hopper.

In operation, the operator keys into the controller a target rate of product transfer and a target weight of product in the weighing hopper. The weight of the weighing hopper is zeroed and the actuator valve applies vacuum to the weighing hopper in order to transfer the product from the inlet hopper to the weighing hopper. When the preset target weight of product in the weighing hopper is reached, the actuator valve bleeds off the vacuum in the weighing hopper before the load cells weigh the product contained in the weighing hopper. Release of the product is delayed until the release of the product results in an actual rate of product transfer equal to the target rate of product transfer. The product is released by opening the sliding gate. The load cells are zeroed after each cycle in order to minimize any drift in the weight measurements.

These and other features, objects and advantages of the present invention will become better understood from a consideration of the following detailed description of the preferred embodiments and appended claims in conjunction with the drawings as described following.

DETAILED DESCRIPTION OF THE INVENTION

Figure 1:
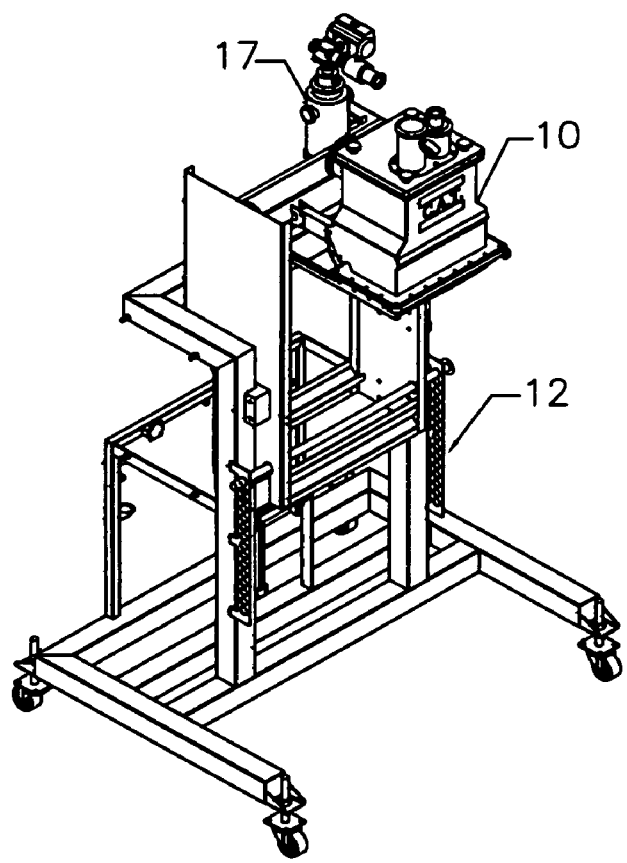
FIG. 1 is a right front perspective view of the weighing hopper, actuator valve and adjustable frame of the present invention.
Figure 2:
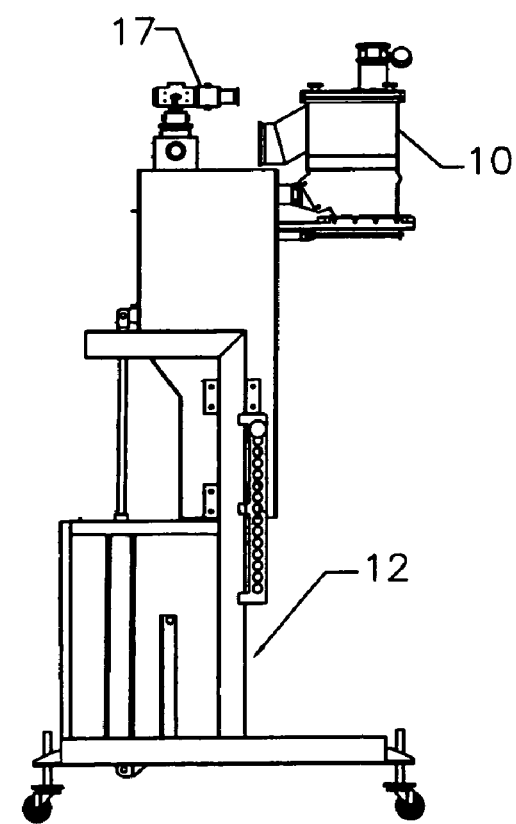
FIG. 2 is a right side elevation view of the weighing hopper, actuator valve and adjustable frame.
Figure 3:
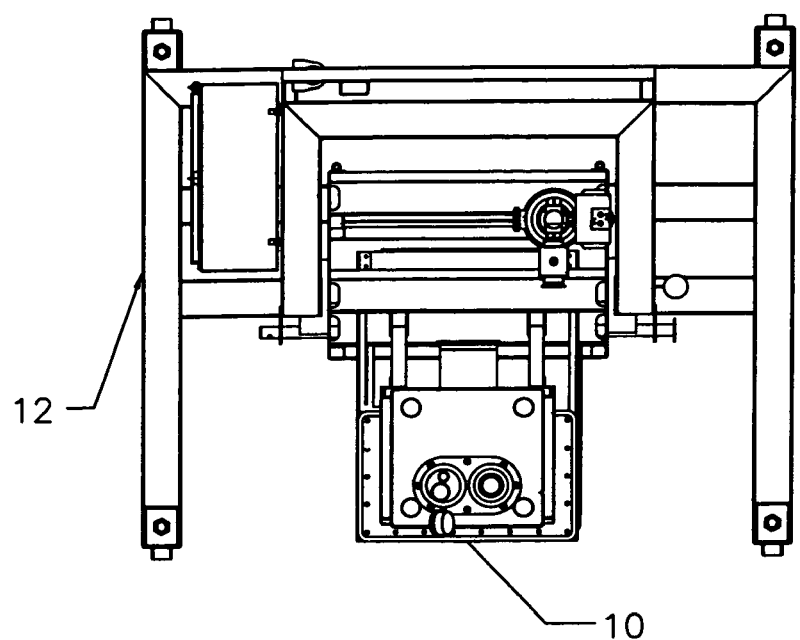
FIG. 3 is a top plan view of the weighing hopper, actuator valve and adjustable frame.
Figure 4:
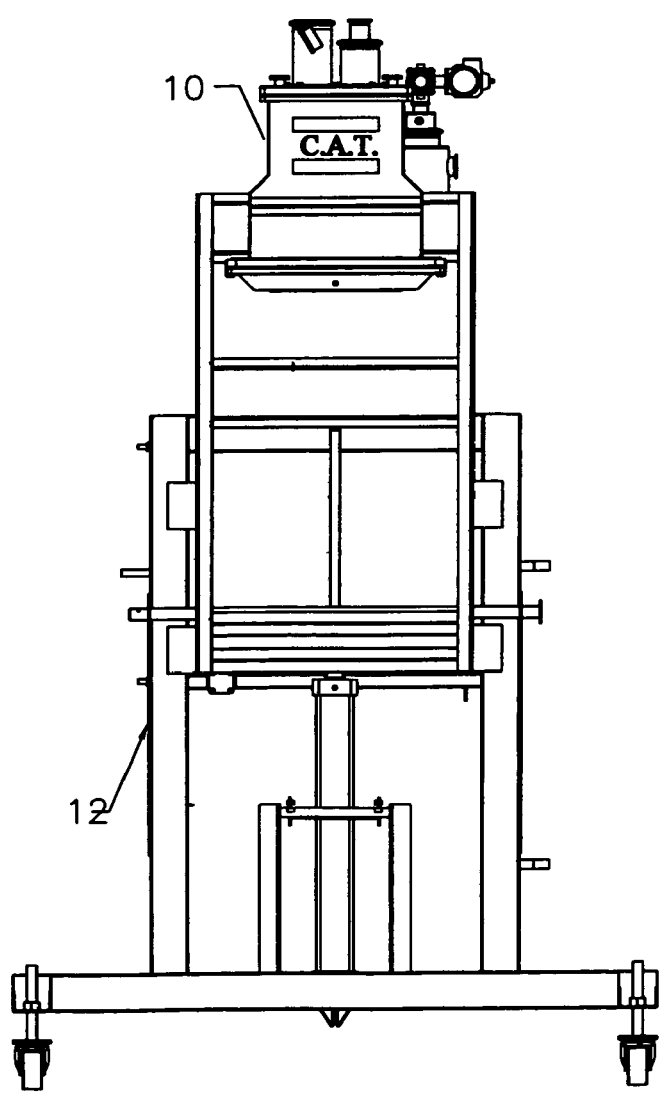
FIG. 4 is a front elevation view of the weighing hopper, actuator valve and adjustable frame.
Figure 5:
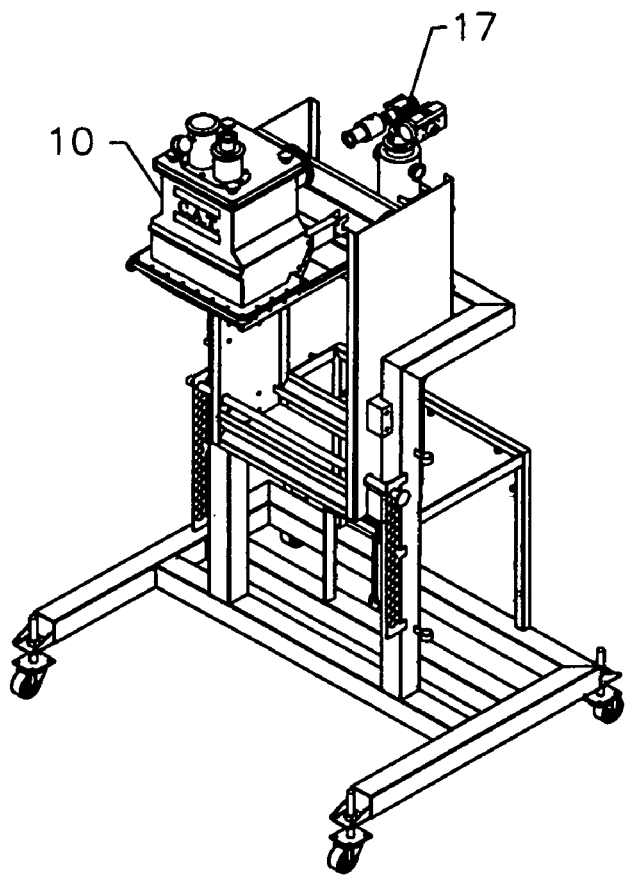
FIG. 5 is a left front perspective view of the weighing hopper, actuator valve and adjustable frame. A side shield is removed to show the load cells.
Figure 6:
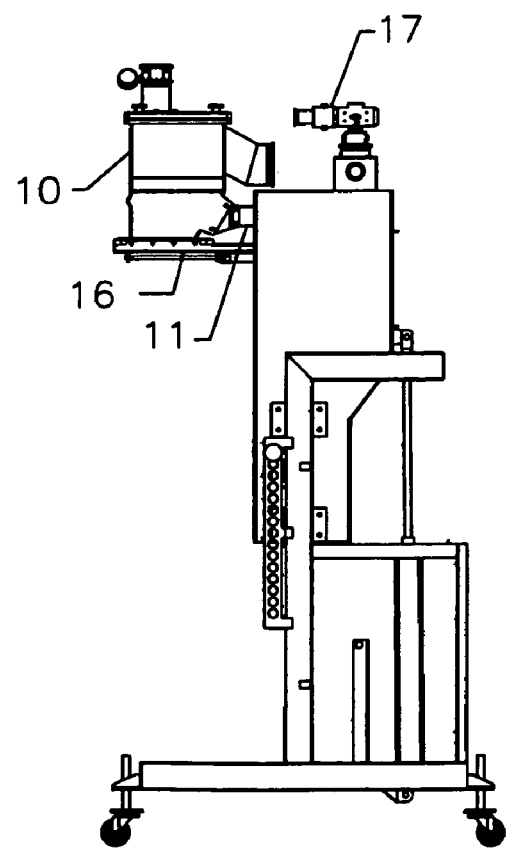
FIG. 6 is a left side elevation view of the weighing hopper, actuator valve and adjustable frame. A side shield is removed to show the load cells.
Figure 7:
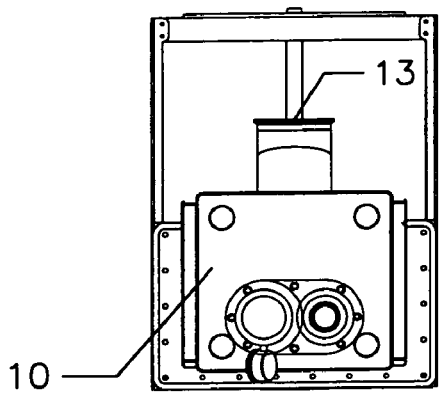
FIG. 7 is a top plan view of the weighing hopper.
Figure 8:
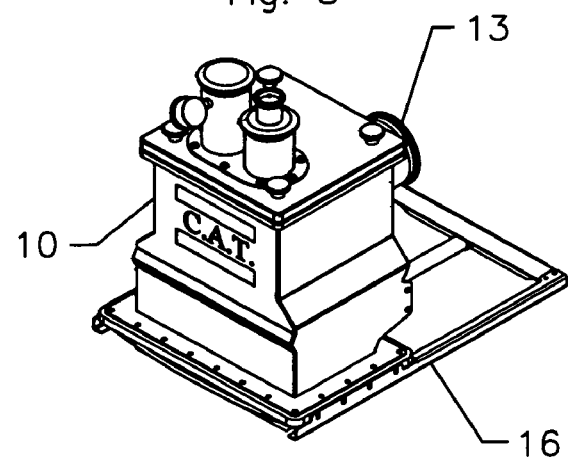
FIG. 8 is a left front perspective view of the weighing hopper.
Figure 9:
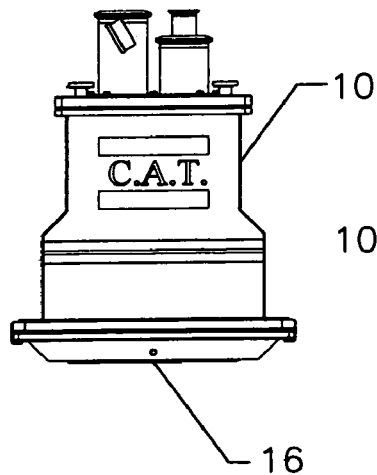
FIG. 9 is a front elevation view of the weighing hopper.
Figure 10:
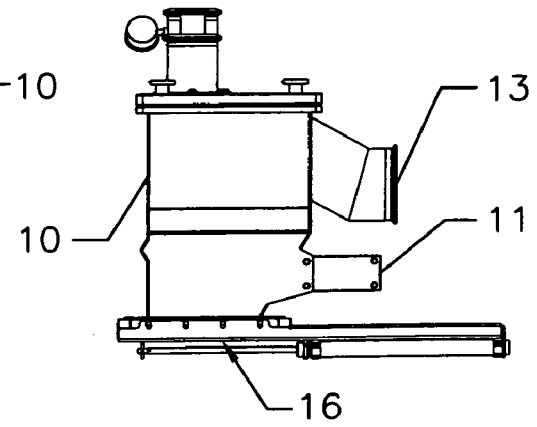
FIG. 10 is a left side elevation view of the weighing hopper.
Figure 11:
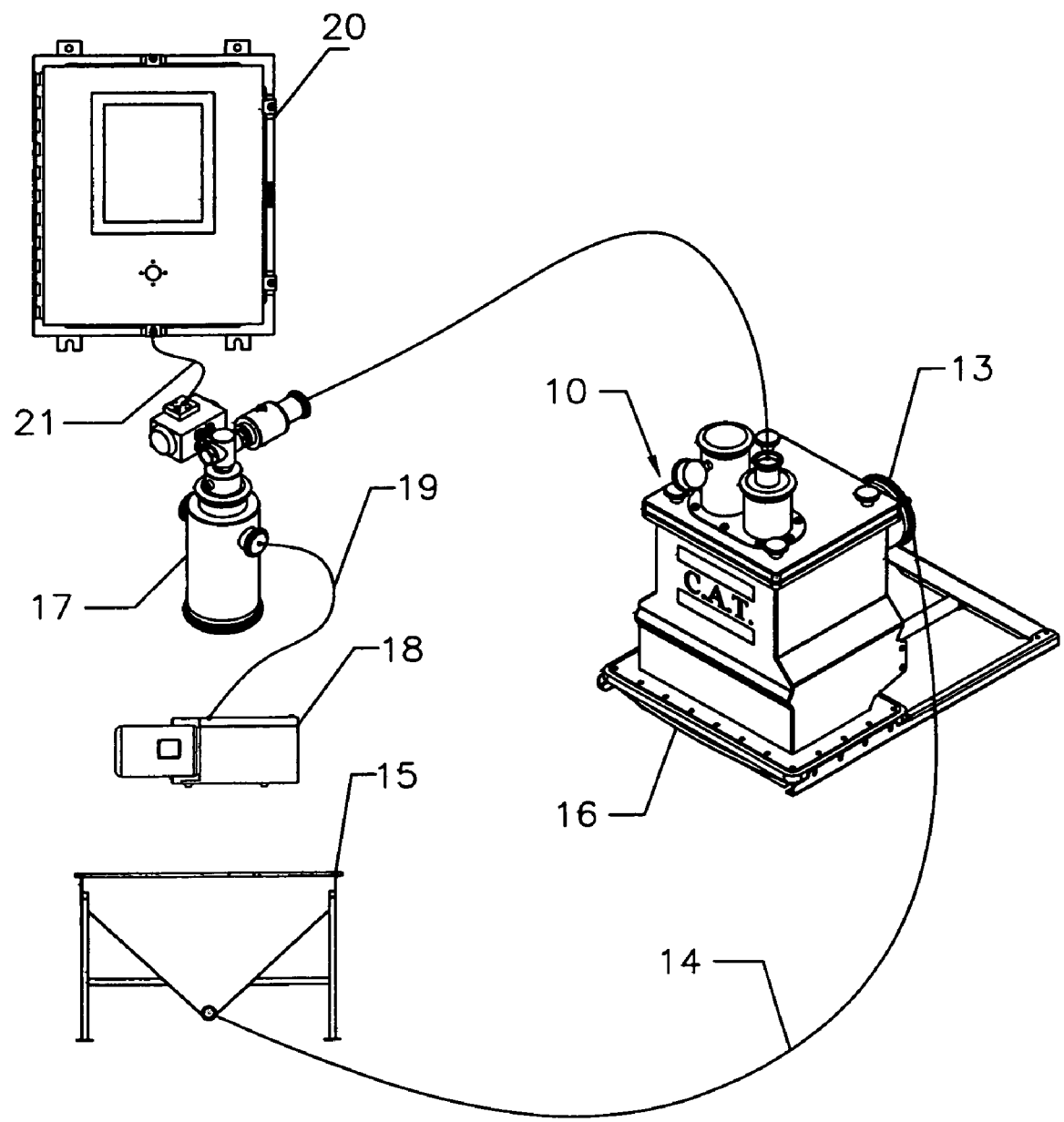
FIG. 11 is a schematic view of the system of the present invention including a perspective view of the weighing hopper, a perspective view of the actuator valve and schematic views of the controller, the vacuum source and the product inlet hopper.
Figure 12:
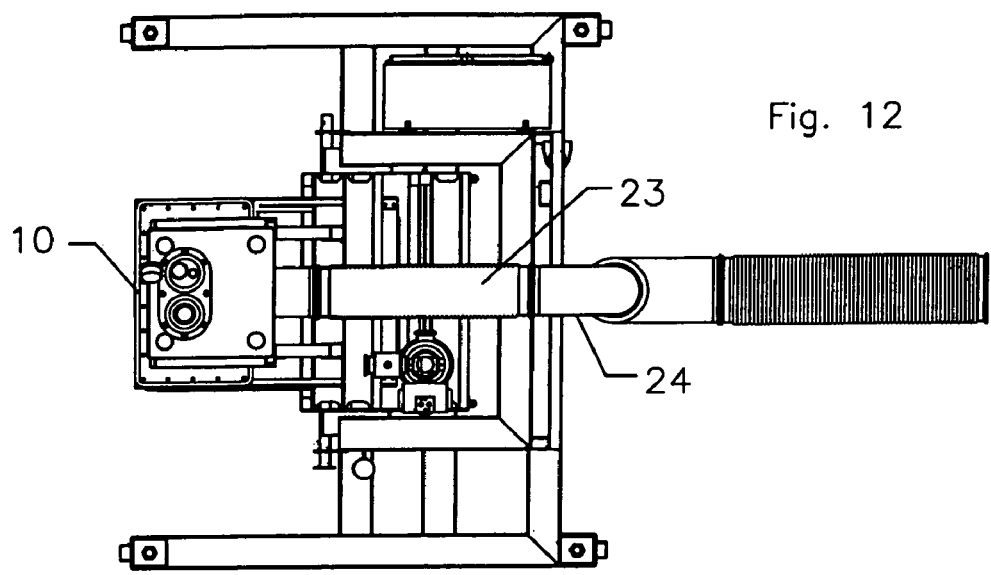
FIG. 12 is a top plan view of the present invention showing the actuator valve operatively connected to the weighing hopper and showing the flexible pipe section and the pivoted rigid pipe section operatively connected to the inlet of the weighing hopper.
Figure 13:
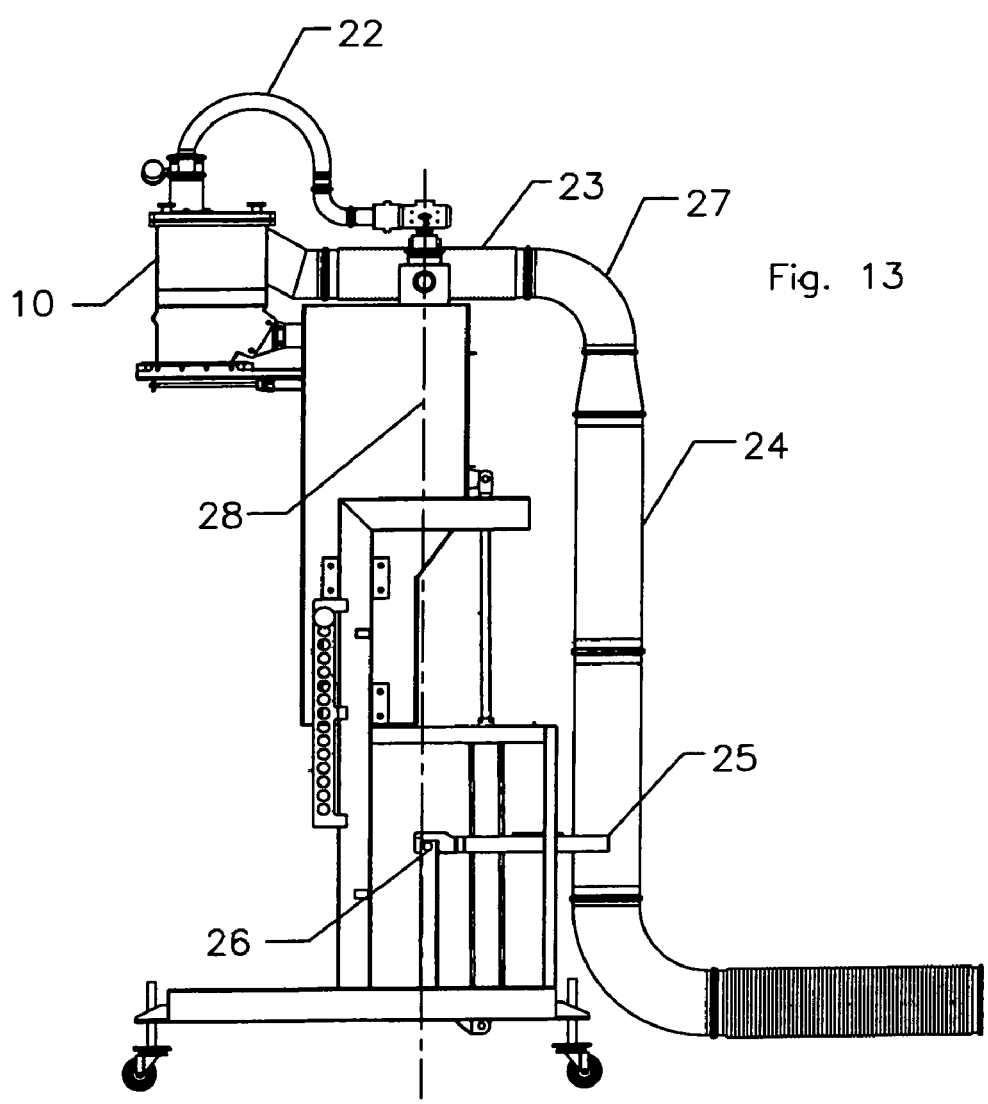
FIG. 13 is a left side elevation view of the present invention as shown in FIG. 12.
Figure 14:
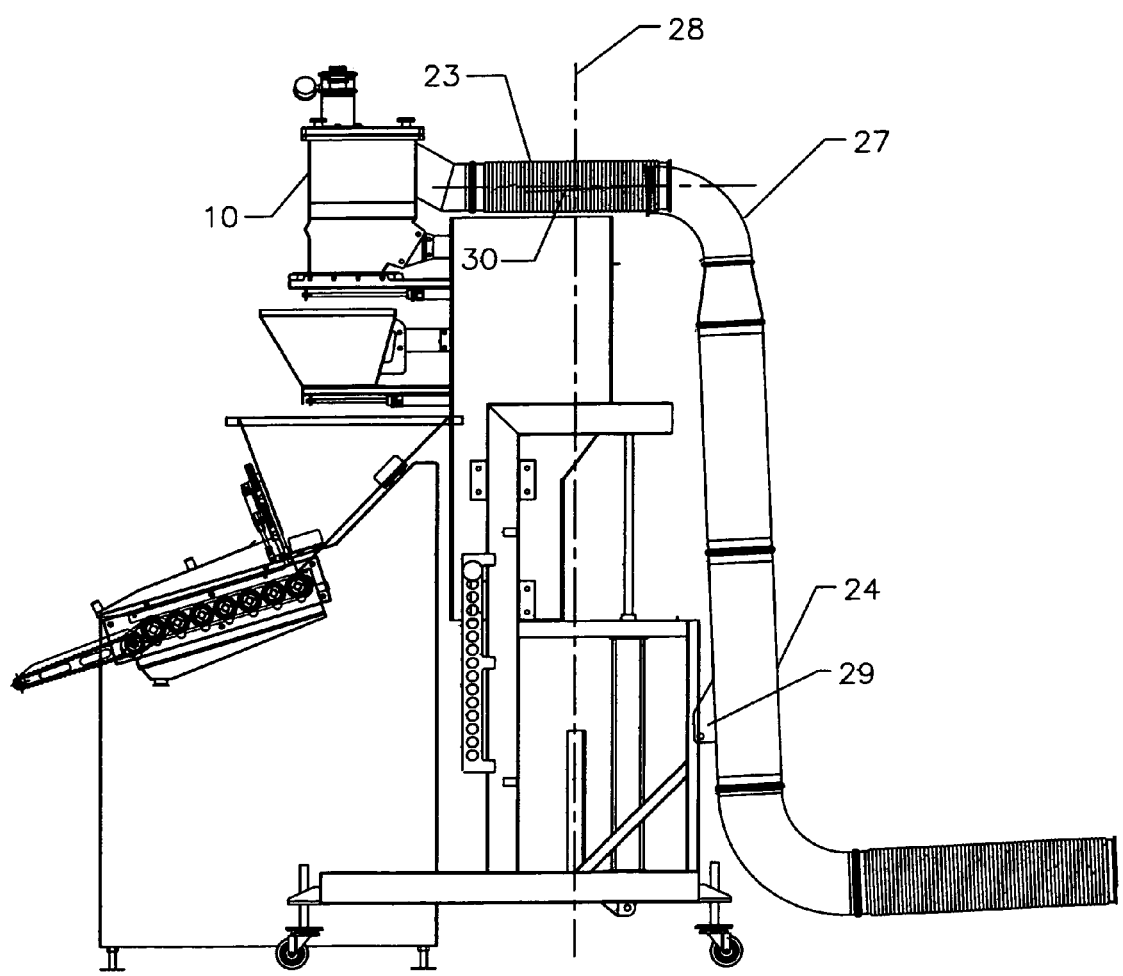
FIG. 14 is a left side elevation view of the present invention illustrating a pivot for the rigid pipe section located away from a vertical line extending from the center of the flexible pipe section.
Figure 15:
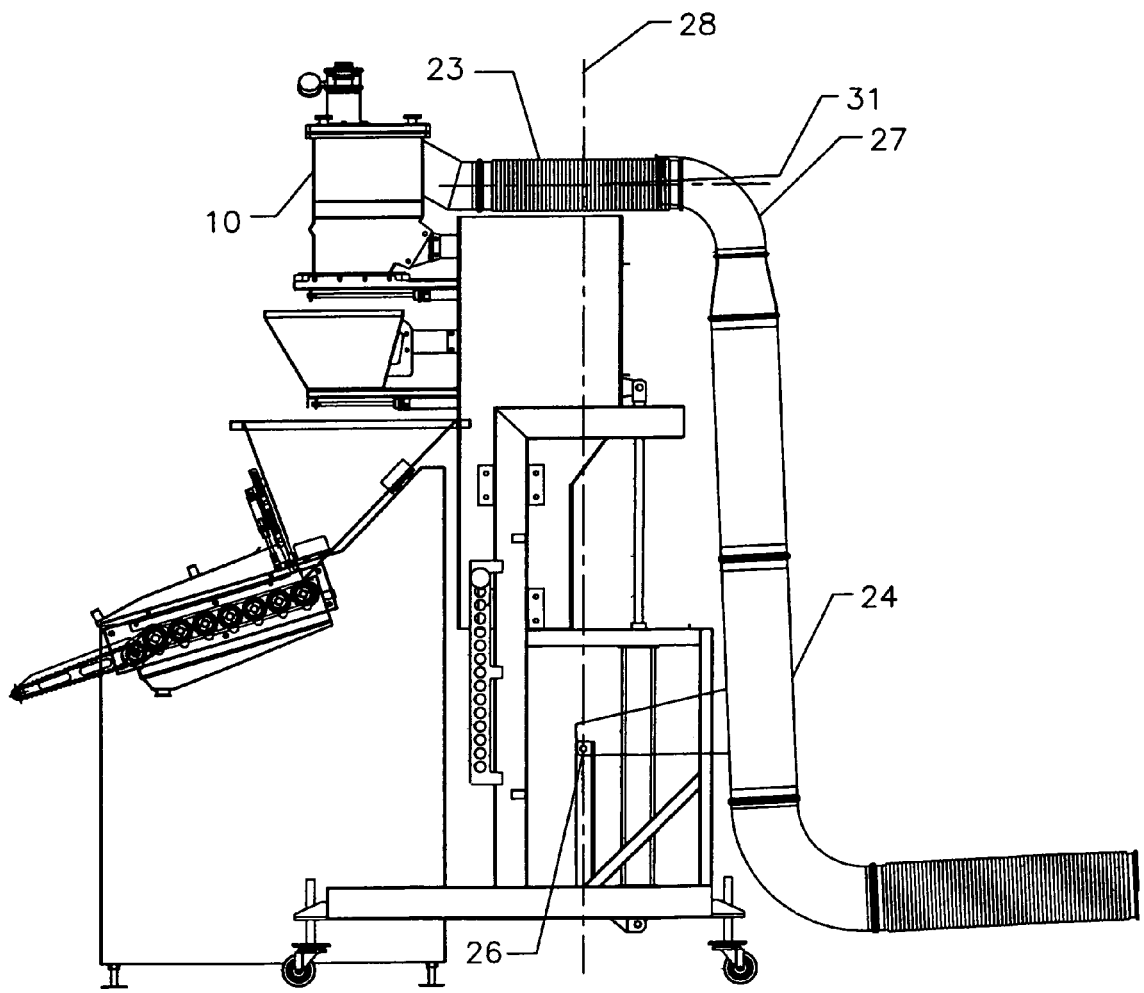
FIG. 15 is a left side elevation view of the present invention illustrating the preferred location of the pivot for the rigid pipe section located below and substantially on a vertical line extending from the center of the flexible pipe section.

With reference to FIGS. 1-15, the preferred embodiment of the present invention may be described.

As shown in FIGS. 1-6, the present invention comprises a weighing hopper 10 mounted via at least one load cell 11 to a frame 12. The frame is desirably adjustable in height. With reference to FIGS. 7-11, the weighing hopper 10 is provided with an inlet 13 connected via a product line 14 to a product inlet hopper 15. The weighing hopper 10 is also provided with an outlet gate 16. An actuator valve 17 is operatively connected to the weighing hopper 10 and to a vacuum source 18 via a vacuum line 19. A controller 20 is operatively connected to the actuator valve 17 via a control line 21 to determine when the actuator valve 17 applies a vacuum to the weighing hopper 10 via hopper vacuum line 22. The controller 20 also controls the opening and closing of the outlet gate 16, which is preferably a sliding gate.

The weighing hopper 10 is supported on at least one load cell 11 that measures loads in a vertical direction only. The product line 14 includes a short flexible pipe section 23 that is attached to the inlet 13 of the weighing hopper 10. The flexible pipe section 23 is oriented substantially horizontally. The flexible pipe section 23 isolates the weighing hopper 10 and the load cell or cells 11 to an appreciable extent from vertical forces that would distort the measurement of the weight of product in the weighing hopper 10. When the vacuum is applied to the weighing hopper 10, the vacuum is also applied to the entire product line 14. If flexible piping were run from the inlet 13 of the weighing hopper 10 to the product inlet hopper 15, the product line 14 would necessarily have a considerable vertical run, since the weighing hopper 10 is located above the product hopper 15. Such a flexible pipe would therefore exert a considerable vertical force on the load cells 11 which would in turn interfere with weight measurements by the load cells 11. Furthermore, this effect would be exacerbated by force due to the vacuum being applied to the flexible piping. Therefore, to avoid this effect as much as possible, only a short horizontal flexible pipe section 23 is used. The flexible pipe section 23 is attached to a substantially vertical rigid pipe section 24. The rigid pipe section 24 is mounted on a support arm which is pivotally mounted to a pivot 26 on the frame 12 to avoid putting too much of a horizontal load on the load cells 11 when the vacuum is applied to the product line 14. When the vacuum is applied to the product line 14, the flexible pipe section 23 will contract and thus cause the upper end 27 of the rigid pipe section 24 to pivot in an arc toward the weighing hopper inlet 13. It is important that this arc be kept as horizontal as possible in order to avoid too much downward movement. Any downward movement applies a vertical force to the weighing hopper 10 and therefore interferes with weight measurement by the load cells 11. In order to avoid any significant downward force being applied by the swinging motion of the rigid pipe section 24, the pivot 26 is mounted as low as possible on the frame 12 and disposed substantially under the center of the flexible pipe section 23. By mounting the pivot 26 as low as, and therefore as far away as, possible from the center of the flexible pipe section 23, the radius of the arc described by the upper end 27 of the rigid pipe section 24 is maximized. Therefore, since a relatively short arc of a large radius circle is more nearly horizontal in its motion than an arc of a smaller radius circle, less downward force is applied to the weighing hopper 10. Further, by placing the pivot 26 of the rigid pipe section 24 substantially under the center of the flexible pipe section 23, more of the motion of the arc is horizontal and less is vertical than would be the case if the pivot 26 were located to one side of a vertical line 28 through the center of the flexible pipe section 23. This effect is illustrated by drawing FIGS. 14 and 15 where in FIG. 14, a displaced pivot 29 is located to one side of the vertical line 28 through the center of the flexible pipe section 23. As a result, the arc 30 described by the upper end 27 of the rigid pipe section 24 shows a greater downward deflection than the arc 31 shown in FIG. 15 where the pivot 26 is located directly below the center of the flexible pipe section 23.

The product may tend to stick to the gate and not release when the gate is opened. A swinging gate may therefore have product stuck to it when the gate is closed, resulting in a poor seal and loss of vacuum around the edges of the gate. For this reason, a sliding gate 16 is preferred, since the sliding action will wipe off product that has adhered to the gate 16 and ensure a good vacuum seal when the gate 16 is closed.

Prior to starting up the system, the operator keys into the controller a target rate of product transfer and a target weight of product in the weighing hopper 10. The system is started and the vacuum source 18 is activated. The load cells 11 are zeroed and the three-way actuator valve 17, for example, an air-operated ball valve, is opened thereby applying vacuum to the weighing hopper 10. The product is transferred by means of the vacuum from the inlet hopper 15 to the weighing hopper 10 until the preset target weight of product in the weighing hopper 10 is reached. The actuator valve 17 then bleeds off the vacuum in the weighing hopper 10 to the atmosphere. The load cells 11 then weigh the product contained in the weighing hopper 10 after the vacuum has been fully released in order to obtain a more accurate determination of the weight of the product in the weighing hopper 10. The weight before the vacuum is released would be affected by the downward pressure on the load cells 11 due to the vacuum in the product line 14. Release of the product is delayed until a time when the release of the product would result in an actual rate of product transfer equal to the target rate of product transfer. The product is released by opening the sliding gate 16. The sliding gate 16 then closes automatically. When the system detects that the weight on the load cells 11 has fallen below a preset weight limit, the weighing hopper 10 is assigned an empty condition and the process begins again.

The product may be dropped from the weighing hopper 10 into an outlet hopper or directly onto a conveyor or may be dropped into a mechanism that spreads out the product along a conveyor in order to allow for easier inspection of the product.

The present invention has been described with reference to certain preferred and alternative embodiments that are intended to be exemplary only and not limiting to the full scope of the present invention as set forth in the appended claims.

What is claimed is:

1. A vacuum transfer system, comprising:
   a frame;
   at least one load cell mounted to said frame;
   a weighing hopper operatively mounted to said at least one load cell, said weighing hopper having an inlet and an outlet gate;
   an actuator valve operatively connected to said weighing hopper and to a vacuum source;
   a controller operatively connected to said actuator valve and said outlet gate;
   a rigid pipe section pivotally mounted to said frame at a pivot, said rigid pipe section having an inlet and an outlet; and
   a flexible pipe section connected between said inlet of said weighing hopper and said outlet of said rigid pipe section.

2. The vacuum transfer system of claim 1, wherein said flexible pipe section has a center and wherein said pivot is disposed substantially beneath said center.

3. The vacuum transfer system of claim 1, wherein said flexible pipe section is disposed substantially horizontally.

4. The vacuum transfer system of claim 1, wherein said rigid pipe section is disposed substantially vertically.

5. The vacuum transfer system of claim 1, wherein said outlet gate comprises a sliding gate.

6. A method of vacuum transferring a product, comprising the steps of:
   (a) providing a weighing hopper operatively mounted to at least one load cell:
   determining a target rate of product transfer and a target weight of product in the weighing hopper:
   (b) zeroing the at least one load cell:
   (c) applying vacuum to the weighing hopper in order to transfer the product to the weighing hopper until the preset target weight of product in the weighing hopper is reached;

(d) bleeding off the vacuum in the weighing hopper before weighing the product contained in the weighing hopper;
(e) releasing the product in the weighing hopper when the release of the product results in an actual rate of product transfer equal to the target rate of product transfer; and
(f) repeating steps (a) through (e),
wherein in step (c), the vacuum is also applied to a product line comprising a rigid pipe section pivotally mounted to a frame at a pivot, said rigid pipe section having an inlet and an outlet, and a flexible pipe section connected between said inlet of said weighing hopper and said outlet of said rigid pipe section.

7. The vacuum transfer system of claim 6, wherein said flexible pipe section has a center and wherein said pivot is disposed substantially beneath said center.

8. The vacuum transfer system of claim 6, wherein said flexible pipe section is disposed substantially horizontally.

9. The vacuum transfer system of claim 6, wherein said rigid pipe section is disposed substantially vertically.

10. The vacuum transfer system of claim 6, wherein said outlet gate comprises a sliding gate.

* * * * *